United States Patent
Kuo

(10) Patent No.: US 12,519,872 B1
(45) Date of Patent: Jan. 6, 2026

(54) METHOD AND APPARATUS FOR SRB0 MESSAGE TRANSMISSION BY INTERMEDIATE U2N RELAY UE IN A WIRELESS COMMUNICATION SYSTEM

(71) Applicant: ASUS Technology Licensing Inc., Taipei (TW)

(72) Inventor: Richard Lee-Chee Kuo, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 19/263,970

(22) Filed: Jul. 9, 2025

Related U.S. Application Data

(60) Provisional application No. 63/689,525, filed on Aug. 30, 2024.

(51) Int. Cl.
*H04L 69/22* (2022.01)
*H04W 72/25* (2023.01)
*H04W 88/04* (2009.01)

(52) U.S. Cl.
CPC ............. *H04L 69/22* (2013.01); *H04W 72/25* (2023.01); *H04W 88/04* (2013.01)

(58) Field of Classification Search
CPC ........ H04L 69/22; H04W 72/25; H04W 88/04
See application file for complete search history.

(56) References Cited

U.S. PATENT DOCUMENTS

2021/0400746 A1* 12/2021 Kuo ...................... H04W 80/02
2021/0400747 A1* 12/2021 Kuo ...................... H04W 76/14

(Continued)

FOREIGN PATENT DOCUMENTS

WO 2024031342 2/2024
WO 2024087582 5/2024

(Continued)

OTHER PUBLICATIONS

Media Tek Inc. "Introduction of Sidelink Relay", RAN2, Work item code: NR SL relay-Core, Category: B, Date: Feb. 21, 2022; Release: Rel-17, R2-220wxyz, 3GPP TSG-RAN WG2 Meeting #117 Electronic Online Meeting, Feb. 21-Mar. 3, 2022.

(Continued)

*Primary Examiner* — Marcus Smith
*Assistant Examiner* — Kai Chang
(74) *Attorney, Agent, or Firm* — Blue Capital Law Firm, P.C.

(57) ABSTRACT

An Intermediate UE-to-Network (U2N) Relay UE is disclosed. The Intermediate U2N Relay UE establishes a first PC5 connection with a Remote UE and establishes a second PC5 connection with a Layer-2 (L2) U2N Relay UE. The Intermediate U2N Relay UE receives a Radio Resource Control (RRC) Setup Request message on SRB0 from the Remote UE, wherein the RRC Setup Request message is included in a first PC5 Sidelink Relay Adaptation Protocol (SRAP) Protocol Data Unit (PDU) without header. The Intermediate U2N Relay UE transmits the RRC Setup Request message on SRB0 to the L2 U2N Relay UE, wherein the RRC Setup Request message is included in a second PC5 SRAP PDU with a first header and the first header includes a UE identity (ID) of the Remote UE and wherein the UE ID of the Remote UE is included in a RRC Reconfiguration message received from a network node.

20 Claims, 16 Drawing Sheets

(56) References Cited

U.S. PATENT DOCUMENTS

| | | | | |
|---|---|---|---|---|
| 2022/0174758 A1* | 6/2022 | Pan | ...................... | H04W 76/19 |
| 2022/0338092 A1* | 10/2022 | Wang | ..................... | H04W 76/14 |
| 2023/0199607 A1* | 6/2023 | Adjakple | .............. | H04W 40/02 |
| | | | | 370/310 |
| 2023/0232485 A1* | 7/2023 | Chen | ..................... | H04W 76/15 |
| | | | | 370/225 |
| 2023/0354152 A1* | 11/2023 | Bangolae | .............. | H04W 40/22 |
| 2025/0142446 A1* | 5/2025 | Zheng | ................... | H04W 76/11 |

FOREIGN PATENT DOCUMENTS

| | | | | |
|---|---|---|---|---|
| WO | WO-2024097885 A1 * | 5/2024 | ............ | H04W 92/18 |
| WO | WO-2024163702 A1 * | 8/2024 | .......... | H04W 36/362 |
| WO | 2025030886 | 2/2025 | | |
| WO | 2025054927 | 3/2025 | | |

OTHER PUBLICATIONS

Huawei, LGE, Ericsoon, "(TP for TS 38.401) Support of multi-hop SL relay", Agenda Item: 22.2, Document for: discussion, R3-252345, 3GPP TSG-RAN WG3 Meeting #127-bis, Wuhan, CN, Apr. 7-11, 2025.

* cited by examiner

| Bit | Description |
|---|---|
| 0 | SRAP Data PDU |
| 1 | SRAP Control PDU (not used in this release) |

| Index | LCID values |
|---|---|
| 0 | SCCH carrying PC5-S messages that are not protected |
| 1 | SCCH carrying PC5-S messages "Direct Security Mode Command" and "Direct Security Mode Complete","ProSe direct link security mode command" and "ProSe direct link security mode complete" |
| 2 | SCCH carrying other PC5-S messages that are protected |
| 3 | SCCH carrying PC5-RRC messages |
| 4–19 | Identity of the logical channel |
| 20 | SCCH carrying PC5-S messages ("Direct Security Mode Command" and "Direct Security Mode Complete") which is used for duplication |
| 21 | SCCH carrying other PC5-S messages that are protected which is used for duplication |
| 22 | SCCH carrying PC5-RRC messages which is used for duplication |
| 23-38 | Identity of the logical channel which is used for duplication |
| 39–52 | Reserved |
| 53 | Enhanced Sidelink Inter-UE Coordination Request |
| 54 | Enhanced Sidelink Inter-UE Coordination Information |
| 55 | SCCH carrying end-to-end SL-SRB0/1/2/3 messages delivered via SL-U2U-RLC as specified in TS 38.331 [5] |
| 56 | SCCH carrying RRC messages delivered via SL-RLC0 as specified in TS 38.331 [5] |
| 57 | SCCH carrying RRC message delivered via SL-RLC1 as specified in TS 38.331 [5] |
| 58 | SCCH for Sidelink Discovery Messages |
| 59 | Sidelink Inter-UE Coordination Request |
| 60 | Sidelink Inter-UE Coordination Information |
| 61 | Sidelink DRX Command |
| 62 | Sidelink CSI Reporting |
| 63 | Padding |

METHOD AND APPARATUS FOR SRB0 MESSAGE TRANSMISSION BY INTERMEDIATE U2N RELAY UE IN A WIRELESS COMMUNICATION SYSTEM

CROSS-REFERENCE TO RELATED APPLICATIONS

The present Application claims the benefit of U.S. Provisional Patent Application Ser. No. 63/689,525 filed on Aug. 30, 2024, the entire disclosure of which is incorporated herein in its entirety by reference.

FIELD

This disclosure generally relates to wireless communication networks, and more particularly, to a method and apparatus for SRB0 message transmission by intermediate U2N relay UE in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device for an Intermediate UE-to-Network (U2N) Relay User Equipment (UE) are disclosed. In one embodiment, the Intermediate U2N Relay UE establishes a first PC5 connection with a Remote UE and establishes a second PC5 connection with a Layer-2 (L2) U2N Relay UE. The Intermediate U2N Relay UE also receives a Radio Resource Control (RRC) Setup Request message on SRB0 from the Remote UE, wherein the RRC Setup Request message is included in a first PC5 Sidelink Relay Adaptation Protocol (SRAP) Protocol Data Unit (PDU) without header. Furthermore, the Intermediate U2N Relay UE transmits the RRC Setup Request message on SRB0 to the L2 U2N Relay UE, wherein the RRC Setup Request message is included in a second PC5 SRAP PDU with a first header and the first header includes a UE identity (ID) of the Remote UE and wherein the UE ID of the Remote UE is included in a RRC Reconfiguration message received from a network node.

BRIEF DESCRIPTION OF THE DRAWINGS

FIG. 15 is a reproduction of Table 6.2.4-1 of 3GPP TS 38.321 V18.2.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 38.300 V18.2.0, "NR; NR and NG-RAN Overall Description; Stage 2 (Release 18)"; TS 38.331 V18.2.0, "NR; Radio Resource Control (RRC) protocol specification (Release 18)"; TS 38.351 V18.2.0, "NR; Sidelink Relay Adaptation Protocol (SRAP) Specification (Release 18)"; TS 38.321 V18.2.0, "NR; Medium Access Control (MAC) protocol specification (Release 18)"; and "TR 23.700-03 V1.0.0, "Study on system enhancement for Proximity based Services (ProSe) in the 5G System (5GS); Phase 3 (Release 19)". The standards and documents listed above are hereby expressly incorporated by reference in their entirety.

Figure 1:
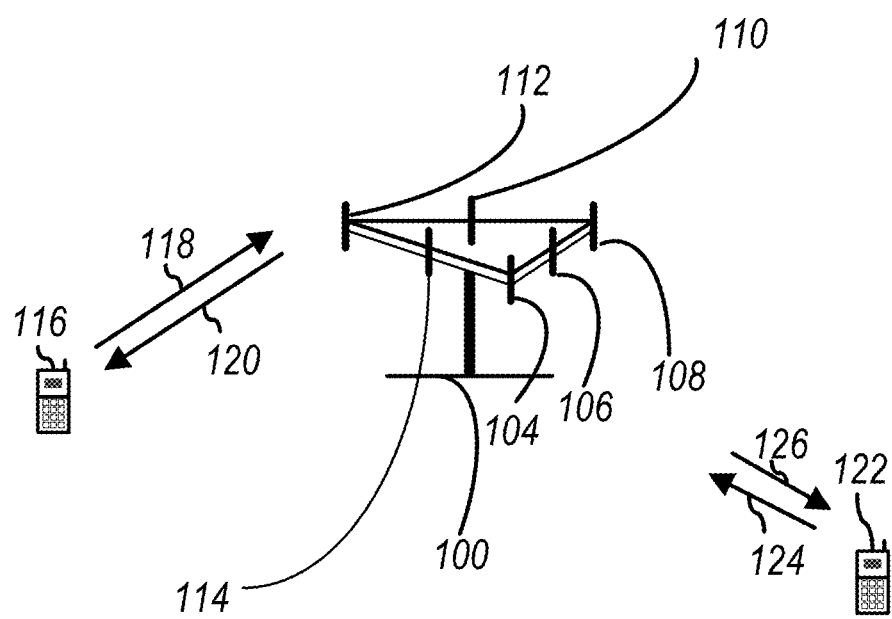
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
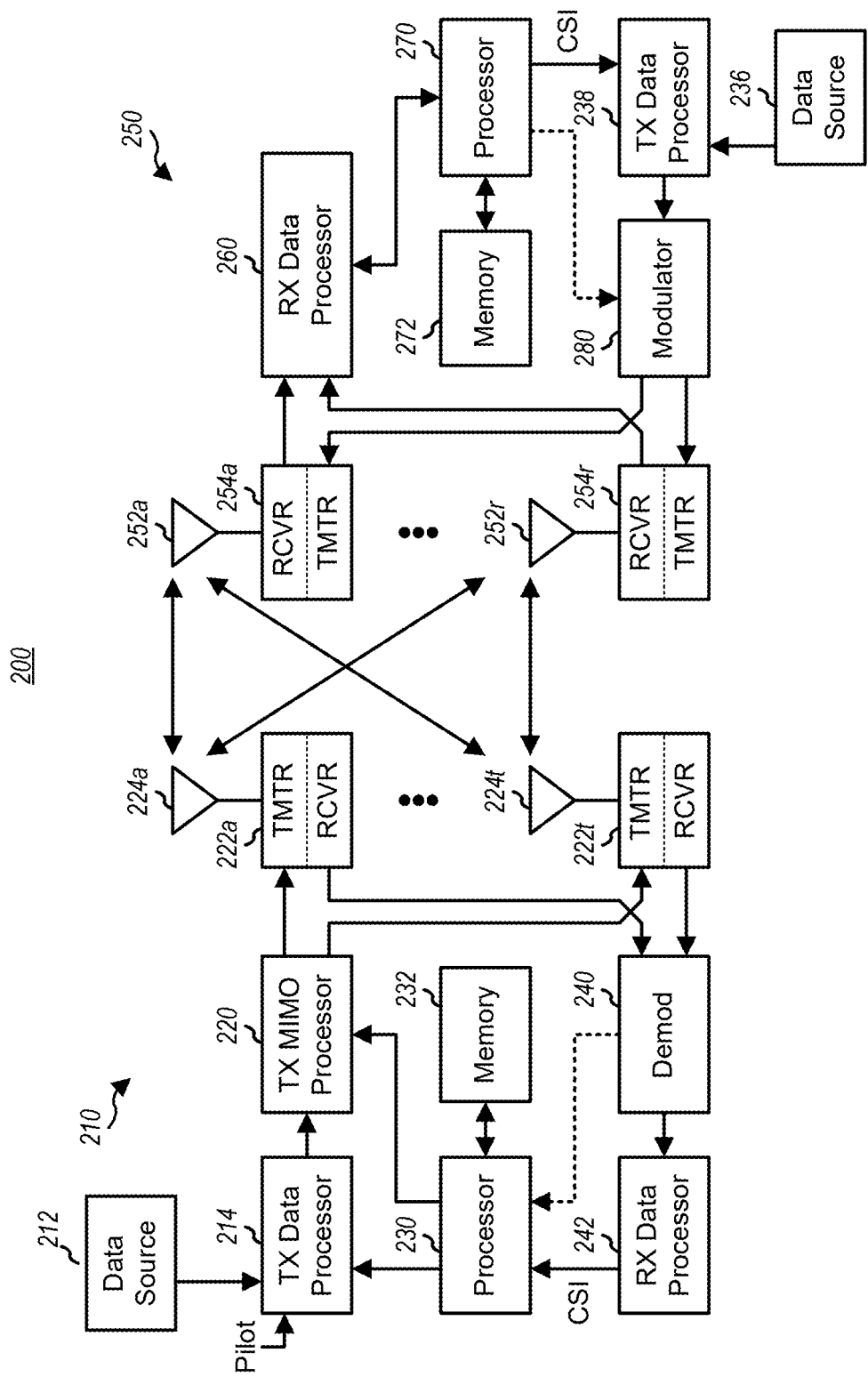
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides Nr modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from Nr antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
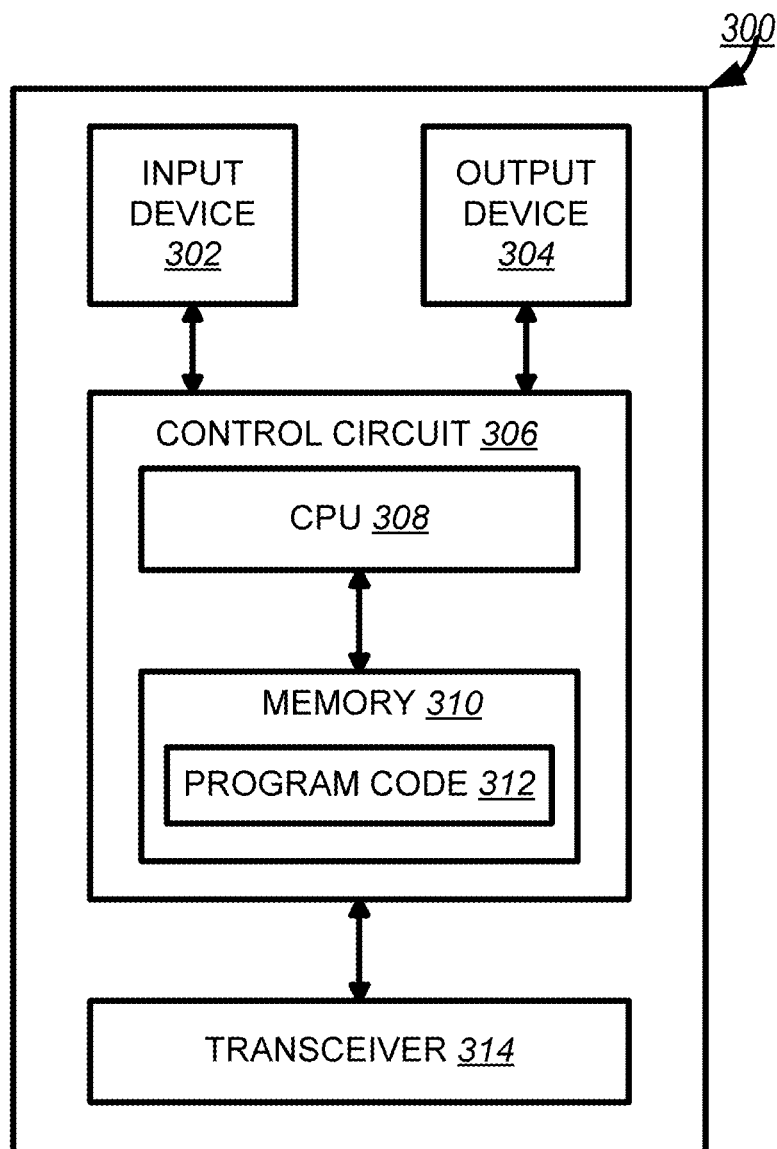
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
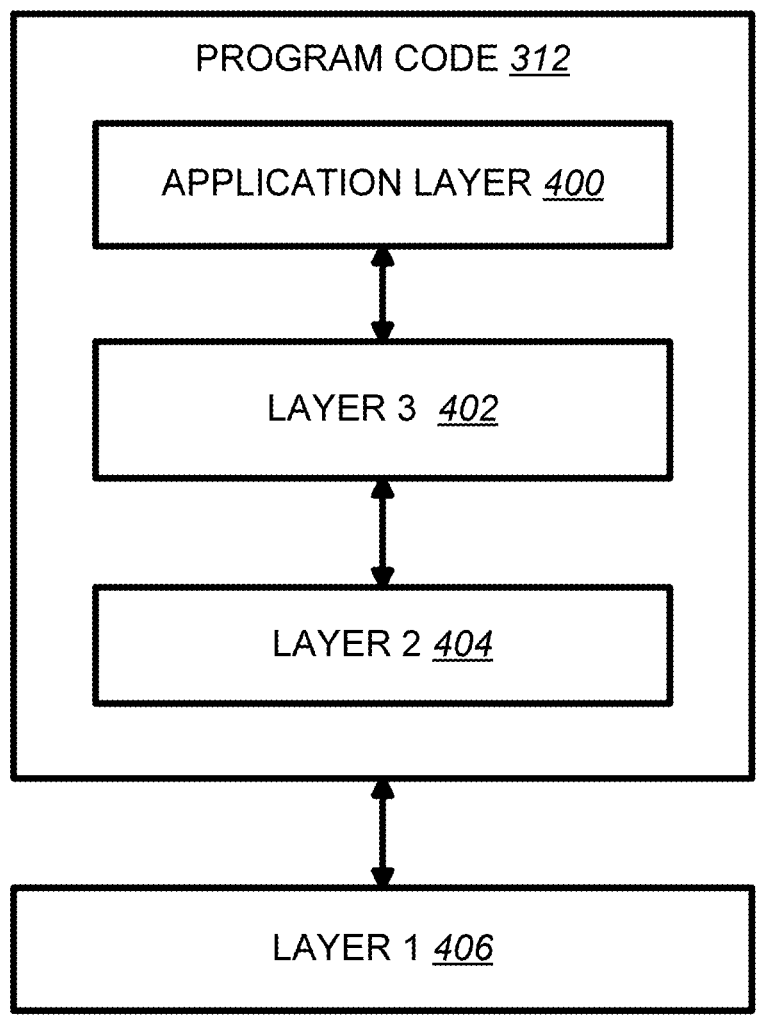
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 38.300 specifies procedures related to UE-to-Network Relay as follows:

16.12 Sidelink Relay 16.12.1 General

Sidelink relay supports 5G ProSe UE-to-Network Relay (U2N Relay) function (specified in TS 23.304 [48]) to provide connectivity to the network for U2N Remote UE(s). Both L2 and L3 U2N Relay architectures are supported. The L3 U2N Relay architecture is transparent to the serving NG-RAN of the U2N Relay UE, except for controlling sidelink resources. The detailed architecture and procedures for L3 U2N Relay can be found in TS 23.304 [48].

A U2N Relay UE shall be in RRC_CONNECTED to perform relaying of unicast data.

For L2 U2N Relay operation, the following RRC state combinations are supported:
  Both L2 U2N Relay UE and L2 U2N Remote UE shall be in RRC_CONNECTED to perform transmission/reception of relayed unicast data; and
  The L2 U2N Relay UE can be in RRC_IDLE, RRC_INACTIVE or RRC_CONNECTED as long as all the L2 U2N Remote UE(s) that are connected to the L2 U2N Relay UE are either in RRC_INACTIVE or in RRC_IDLE.

A single unicast link is established between one L2 U2N Relay UE and one L2 U2N Remote UE. The traffic to the NG-RAN of L2 U2N Remote UE via a given L2 U2N Relay UE and the traffic of the L2 U2N Relay UE shall be separated in different Uu RLC channels.

For L2 U2N Relay, the L2 U2N Remote UE can only be configured to use resource allocation mode 2 (as specified in 5.7.2 and 16.9.3.1) for data to be relayed.

16.12.2 Protocol Architecture 16.12.2.1 L2 UE-to-Network Relay

Figure 16:
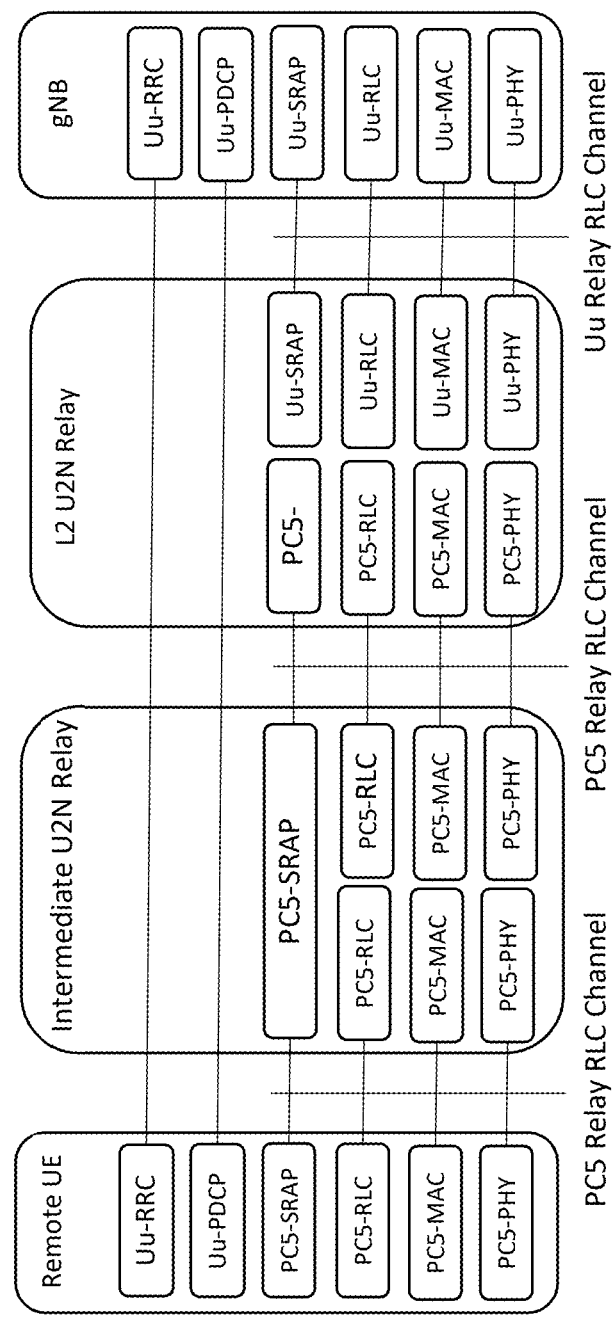
FIG. 16 is a diagram illustrating control plane protocol stack for two-hop L2 UE-to-Network Relay according to one exemplary embodiment.

The protocol stacks for the user plane and control plane of L2 U2N Relay architecture are illustrated in FIG. 16.12.2.1-1 and FIG. 16.12.2.1-2. The SRAP sublayer is placed above the RLC sublayer for both CP and UP at both PC5 interface and Uu interface. The Uu SDAP, PDCP and RRC are terminated between L2 U2N Remote UE and gNB, while SRAP, RLC, MAC and PHY are terminated in each hop (i.e., the link between L2 U2N Remote UE and the L2 U2N Relay UE and the link between L2 U2N Relay UE and the gNB).

For L2 U2N Relay, the SRAP sublayer over PC5 hop is only for the purpose of bearer mapping. The SRAP sublayer is not present over PC5 hop for relaying the L2 U2N Remote UE's message on BCCH and PCCH. For L2 U2N Remote UE's message on SRB0, the SRAP header is not present over PC5 hop, but the SRAP header is present over Uu hop for both DL and UL.

Figure 5:
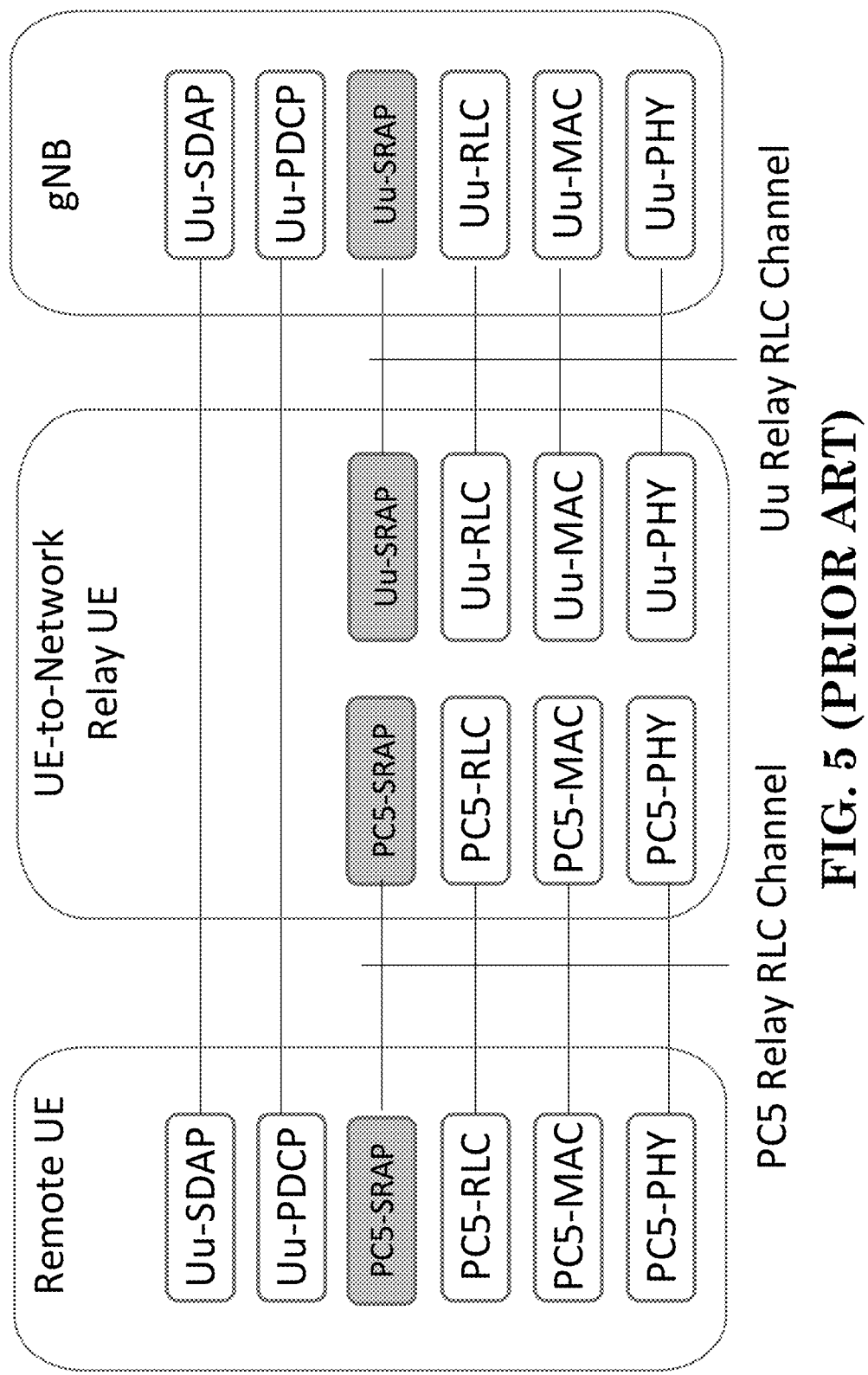
FIG. 5 is a reproduction of FIG. 16.12.2.1-1 of 3GPP TS 38.300 V18.2.0.

FIG. 16.12.2.1-1 of 3GPP TS 38.300 V18.2.0, Entitled "User Plane Protocol Stack for L2 UE-To-Network Relay", is Reproduced as FIG. 5

Figure 6:
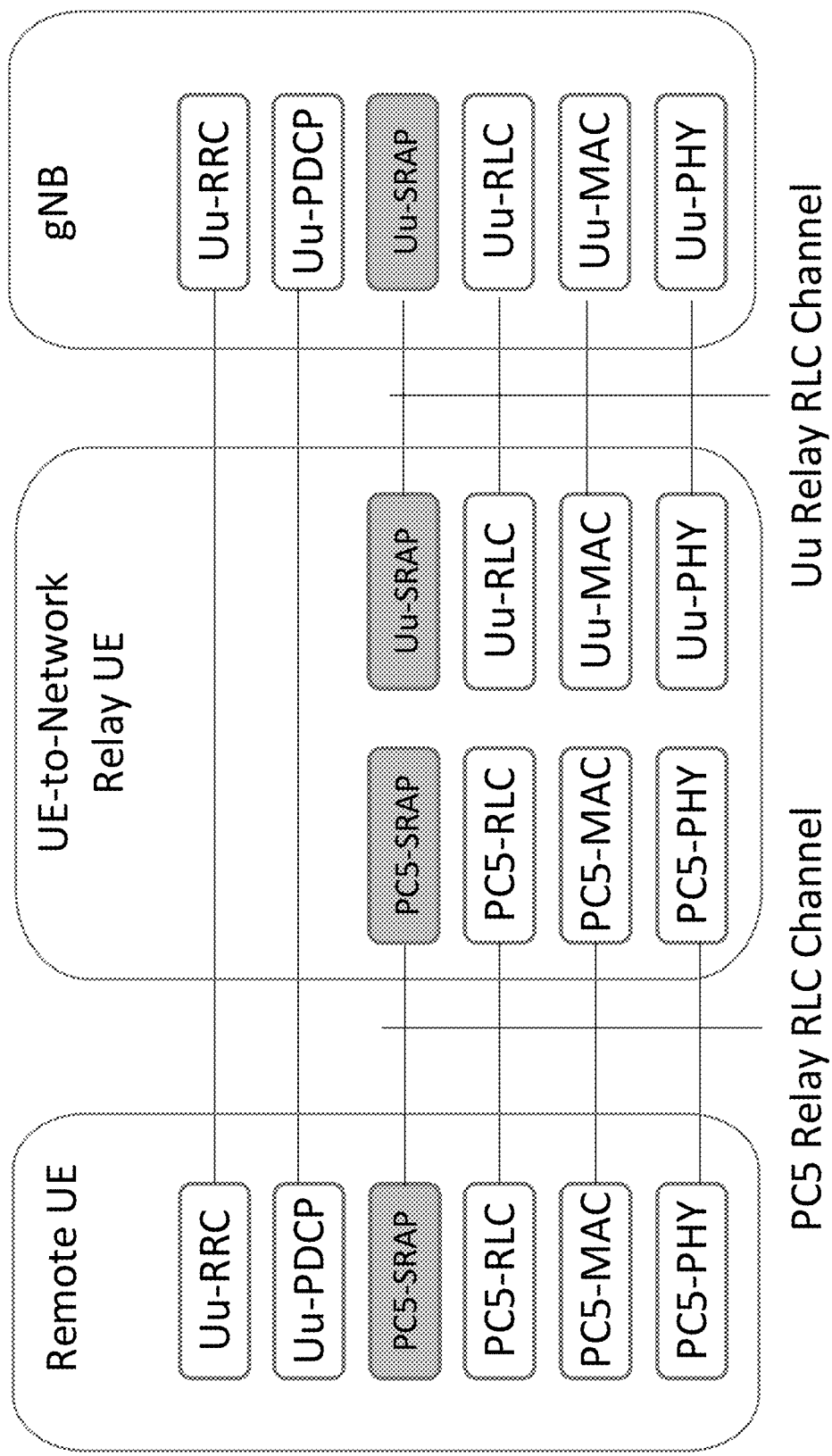
FIG. 6 is a reproduction of FIG. 16.12.2.1-2 of 3GPP TS 38.300 V18.2.0.

FIG. 16.12.2.1-2 of 3GPP TS 38.300 V18.2.0, Entitled "Control Plane Protocol Stack for L2 UE-to-Network Relay", is Reproduced as FIG. 6

For L2 U2N Relay, for uplink:
The Uu SRAP sublayer performs UL bearer mapping between end-to-end Uu Radio Bearers of L2 U2N remote UE (identified for the purposes of this mapping by the local Remote UE ID and an associated bearer ID) and egress Uu Relay RLC channels over the L2 U2N Relay UE Uu interface. For uplink relaying traffic, the different end-to-end Uu Radio Bearers (SRBs or DRBs) of the same L2 U2N Remote UE and/or different L2 U2N Remote UEs can be multiplexed over the same egress Uu Relay RLC channel;
The Uu SRAP sublayer supports L2 U2N Remote UE identification for the UL traffic. The identity information of L2 U2N Remote UE end-to-end Uu Radio Bearer and a local Remote UE ID are included in the Uu SRAP header at UL in order for gNB to correlate the received packets for the specific PDCP entity associated with the right end-to-end Uu Radio Bearer of the L2 U2N Remote UE;
The PC5 SRAP sublayer at the L2 U2N Remote UE supports UL bearer mapping between L2 U2N Remote UE end-to-end Uu Radio Bearers and egress PC5 Relay RLC channels.

For L2 U2N Relay, for downlink:
The Uu SRAP sublayer performs DL bearer mapping at gNB to map end-to-end Uu Radio Bearer (SRB, DRB) of L2 U2N Remote UE (identified for the purposes of this mapping by the local Remote UE ID and an associated bearer ID) into Uu Relay RLC channel. The Uu SRAP sublayer performs DL bearer mapping and data multiplexing between multiple end-to-end Radio Bearers (SRBs or DRBs) of a L2 U2N Remote UE and/or different L2 U2N Remote UEs and one Uu Relay RLC channel over the L2 U2N Relay UE Uu interface;
The Uu SRAP sublayer supports L2 U2N Remote UE identification for DL traffic. The identity information of L2 U2N Remote UE end-to-end Uu Radio Bearer and a local Remote UE ID are included into the Uu SRAP header by the gNB at DL for the L2 U2N Relay UE to identify the corresponding end-to-end Uu Radio Bearer(s) of L2 U2N Remote UE;
The PC5 SRAP sublayer at the L2 U2N Relay UE performs DL bearer mapping between end-to-end Uu Radio Bearers of L2 U2N remote UE and egress PC5 Relay RLC channels;
The PC5 SRAP sublayer at the L2 U2N Remote UE correlates the received packets with the right PDCP entity associated with the given end-to-end Uu Radio Bearer of the L2 U2N Remote UE based on the identity information included in the PC5 SRAP header.

A local Remote UE ID is included in both PC5 SRAP header and Uu SRAP header. L2 U2N Relay UE is configured by the gNB with the local Remote UE ID(s) to be used in SRAP header. L2 U2N Remote UE obtains the local Remote ID from the gNB via Uu RRC messages including RRCSetup, RRCReconfiguration, RRCResume and RRCReestablishment.

The end-to-end DRB(s) or end-to-end SRB(s), except SRB0, of L2 U2N Remote UE can be multiplexed to the PC5 Relay RLC channels and Uu Relay RLC channels in both PC5 hop and Uu hop, but an end-to-end DRB and an end-to-end SRB can neither be mapped into the same PC5 Relay RLC channel nor be mapped into the same Uu Relay RLC channel.

It is the gNB responsibility to avoid collision on the usage of local Remote UE ID. The gNB can update the local Remote UE ID by sending the updated local Remote UE ID via RRCReconfiguration message. The serving gNB can perform local Remote UE ID update independent of the PC5 unicast link L2 ID update procedure.

16.12.5 Control Plane Procedures for L2 U2N Relay

16.12.5.1 RRC Connection Management

The L2 U2N Remote UE needs to establish its own PDU sessions/DRBs with the network before user plane data transmission.

The NR sidelink PC5 unicast link establishment procedures can be used to setup a secure unicast link between L2 U2N Remote UE and L2 U2N Relay UE before L2 U2N Remote UE establishes a Uu RRC connection with the network via L2 U2N Relay UE.

The establishment of Uu SRB1/SRB2 and DRB of the L2 U2N Remote UE is subject to Uu configuration procedures for L2 UE-to-Network Relay.

Figure 7:
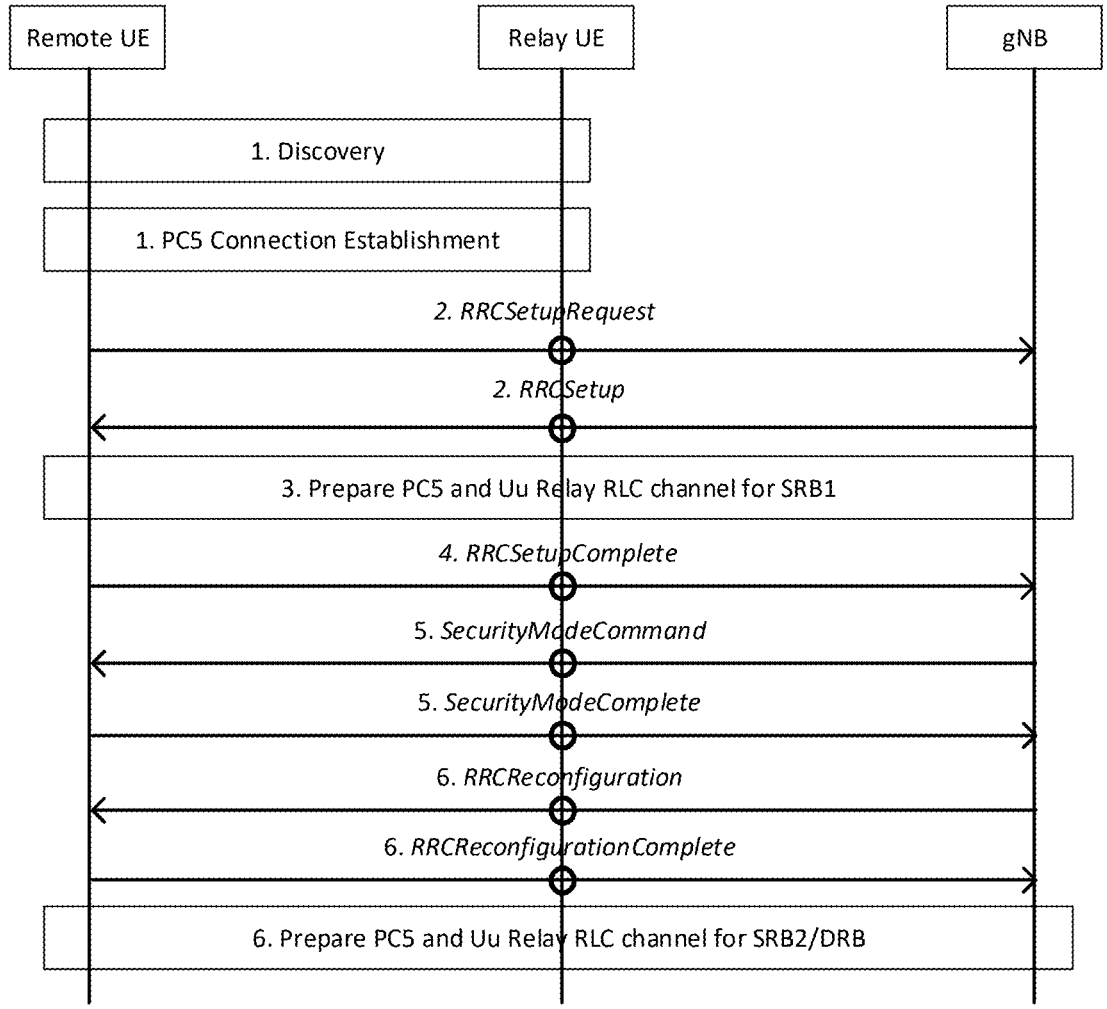
FIG. 7 is a reproduction of FIG. 16.12.5.1-1 of 3GPP TS 38.300 V18.2.0.

The following high level connection establishment procedure in FIG. 16.12.5.1-1 applies to a L2 U2N Relay and L2 U2N Remote UE:

FIG. 16.12.5.1-1 of 3GPP TS 38.300 V18.2.0, Entitled "Procedure for L2 U2N Remote UE Connection Establishment", is Reproduced as FIG. 7

1. The L2 U2N Remote and L2 U2N Relay UE perform discovery procedure, and establish a PC5-RRC connection using the NR sidelink PC5 unicast link establishment procedure.
2. The L2 U2N Remote UE sends the first RRC message (i.e., RRCSetupRequest) for its connection establishment with gNB via the L2 U2N Relay UE, using a specified PC5 Relay RLC channel configuration. The L2 U2N Relay UE sends the SidelinkUEInformationNR message to request for the dedicated configurations required to support the relay operation for the L2 U2N Remote UE. If the L2 U2N Relay UE is not in RRC_CONNECTED, it needs to do its own Uu RRC connection establishment upon reception of a message on the specified PC5 Relay RLC channel. After L2 U2N Relay UE's RRC connection establishment procedure and sending the SidelinkUEInformationNR message, gNB configures SRB0 relaying Uu Relay RLC channel to the U2N Relay UE. The gNB responds with an RRCSetup message to L2 U2N Remote UE. The RRCSetup message is sent to the L2 U2N Remote UE using SRB0 relaying Uu Relay RLC channel over Uu and a specified PC5 Relay RLC channel over PC5.

Note 1: Void.

3. The gNB and L2 U2N Relay UE perform relaying channel setup procedure over Uu. According to the configuration from gNB, the L2 U2N Relay/Remote UE establishes a PC5 Relay RLC channel for relaying of SRB1 towards the L2 U2N Remote/Relay UE over PC5.
4. The RRCSetupComplete message is sent by the L2 U2N Remote UE to the gNB via the L2 U2N Relay UE using SRB1 relaying channel over PC5 and SRB1 relaying channel configured to the L2 U2N Relay UE over Uu. Then the L2 U2N Remote UE is as in RRC_CONNECTED with the gNB.
5. The L2 U2N Remote UE and gNB establish security following the Uu security mode procedure and the security messages are forwarded through the L2 U2N Relay UE.
6. The gNB sends an RRCReconfiguration message to the L2 U2N Remote UE via the L2 U2N Relay UE, to setup the end-to-end SRB2/DRBs of the L2 U2N Remote UE. The L2 U2N Remote UE sends an RRCReconfigurationComplete message to the gNB via the L2 U2N Relay UE as a response. In addition, the gNB may configure additional Uu Relay RLC channels between the gNB and L2 U2N Relay UE, and PC5 Relay RLC channels between L2 U2N Relay UE and L2 U2N Remote UE for the relaying traffic.

3GPP TS 38.331 specifies Sidelink UE information and specified SCCH configuration for SRB0 related to UE-to-Network Relay as follows:

5.8.3 Sidelink UE Information for NR Sidelink Communication/Discovery/Positioning

5.8.3.1 General

Figure 8:
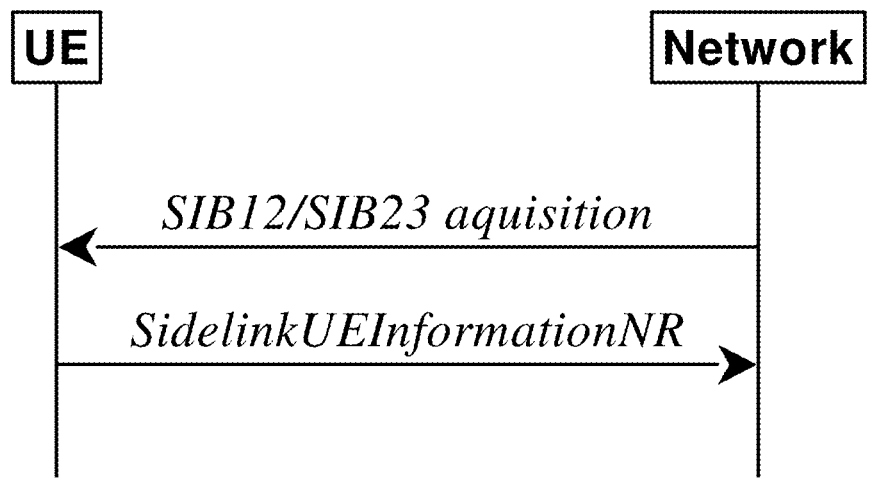
FIG. 8 is a reproduction of FIG. 5.8.3.1-1 of 3GPP TS 38.331 V18.2.0.

FIG. 5.8.3.1-1 of 3GPP TS 38.331 V18.2.0, Entitled "Sidelink UE Information for NR Sidelink Communication/Discovery/Positioning", is Reproduced as FIG. 8

The purpose of this procedure is to inform the network that the UE:
- is interested or no longer interested to receive or transmit NR sidelink communication/discovery/positioning,
- is requesting assignment or release of transmission resource for NR sidelink communication/discovery/positioning,
- is reporting QoS parameters and QoS profile(s) related to NR sidelink communication,
- is reporting mapped frequency(ies) for each QoS flow related to NR sidelink communication,
- is reporting associated Tx Profile for each QoS flow related to NR sidelink groupcast and broadcast communication,
- is reporting that a sidelink radio link failure, sidelink RRC reconfiguration failure or a sidelink carrier failure has been detected,
- is reporting the sidelink UE capability information of the associated peer UE for unicast communication,
- is reporting the RLC mode information of the sidelink data radio bearer(s) received from the associated peer UE for unicast communication, is reporting the accepted sidelink DRX configuration received from the associated peer UE for NR sidelink unicast reception, is reporting the sidelink DRX assistance information received from the associated peer UE for NR sidelink unicast transmission, when the UE is configured with sl-ScheduledConfig, is reporting, for NR sidelink groupcast transmission, the sidelink DRX on/off indication for the associated Destination Layer-2 ID, when the UE is configured with sl-ScheduledConfig, is reporting, for NR sidelink groupcast or broadcast reception, the Destination Layer-2 ID and QoS profile(s) associated with its interested services to which sidelink DRX is applied, is reporting DRX configuration reject information from its associated peer UE for NR sidelink unicast transmission, when the UE is configured with sl-ScheduledConfig, is reporting parameters related to U2N relay operation, is reporting parameters related to U2U relay operation.

5.8.3.3 Actions Related to Transmission of SidelinkUEInformationNR Message

The UE shall set the contents of the SidelinkUEInformationNR message as follows:
3> if SIB12 includes sl-L2U2N-Relay and if configured by upper layers to transmit NR sidelink L2 U2N relay communication and the UE is acting as L2 U2N Relay UE:
    4> include sl-TxResourceReqL2U2N-Relay in sl-TxResourceReqListCommRelay and set its fields (if needed) as follows for each destination for which it requests network to assign NR sidelink L2 U2N relay communication resource:
        5> set sl-DestinationIdentityL2U2N to the destination identity configured by upper layer for NR sidelink L2 U2N relay communication transmission;
        5> set sl-TxInterestedFreqListL2U2N to indicate the frequency of the associated destination for NR sidelink L2 U2N relay communication transmission;
        5> set sl-TypeTxSyncListL2U2N to the current synchronization reference type used on the associated sl-TxInterestedFreqListL2U2N for NR sidelink L2 U2N relay communication transmission;
        5> set sl-LocalID-Request to request local ID for L2 U2N Remote UE transiting to RRC_CONNECTED or in RRC_CONNECTED state;
        5> set sl-PagingIdentityRemoteUE to the paging UE ID received from peer L2 U2N Remote UE, if it is not released as in 5.8.9.8.3;
        5> set sl-CapabilityInformationSidelink to include UECapabilityInformationSidelink message, if any, received from peer UE;
    4> include ue-Type and set it to relayUE;

9.1 Specified Configurations

9.1.1 Logical Channel Configurations

9.1.1.4 SCCH Configuration

Parameters that are specified for NR sidelink L2 U2N Relay operations, which is used for the PC5 Relay RLC channel for Remote UE's SRB0 message transmission/reception. The PC5 Relay RLC channel using this configuration is named as SL-RLC0.

| Name | Value | Semantics description | Ver |
|---|---|---|---|
| RLC configuration | | AM | |
| >sn-FieldLength | 12 | | |
| >t-Reassembly | Undefined | Selected by the receving UE, up to UE implementation | |
| >t-PollRetransmit | Undefined | Selected by the transmitting UE, up to UE implementation | |
| >pollPDU | Undefined | Selected by the transmitting UE, up to UE implementation | |
| >pollByte | Undefined | Selected by the transmitting UE, up to UE implementation | |
| >maxRetxThreshold | Undefined | Selected by the transmitting UE, up to UE implementation | |
| >t-StatusProhibit | Undefined | Selected by the receving UE, up to UE implementation | |
| >logicalChannelIdentity | 56 | | |
| MAC configuration | | | |
| >priority | 1 | | |
| >prioritisedBitRate | Infinity | | |
| >logicalChannelGroup | 0 | | |
| >schedulingRequestId | 0 | The scheduling request configuration with this value is applicable for this SCCH if configured by the network. The scheduling request configuration is not applicable to L2 U2N Remote UE. | |
| >sl-HARQ-FeedbackEnabled | Undefined | Selected by the transmitting UE, up to UE implementation | |

3GPP TS 38.351 specifies protocol data units, formats, and parameters of SRAP layer as follows:

4.2.2 SRAP Entities

FIG. 4.2.2-1 represents one possible structure for the SRAP sublayer. The figure is based on the radio interface protocol architecture defined in TS 38.300 [2].

Figure 9:
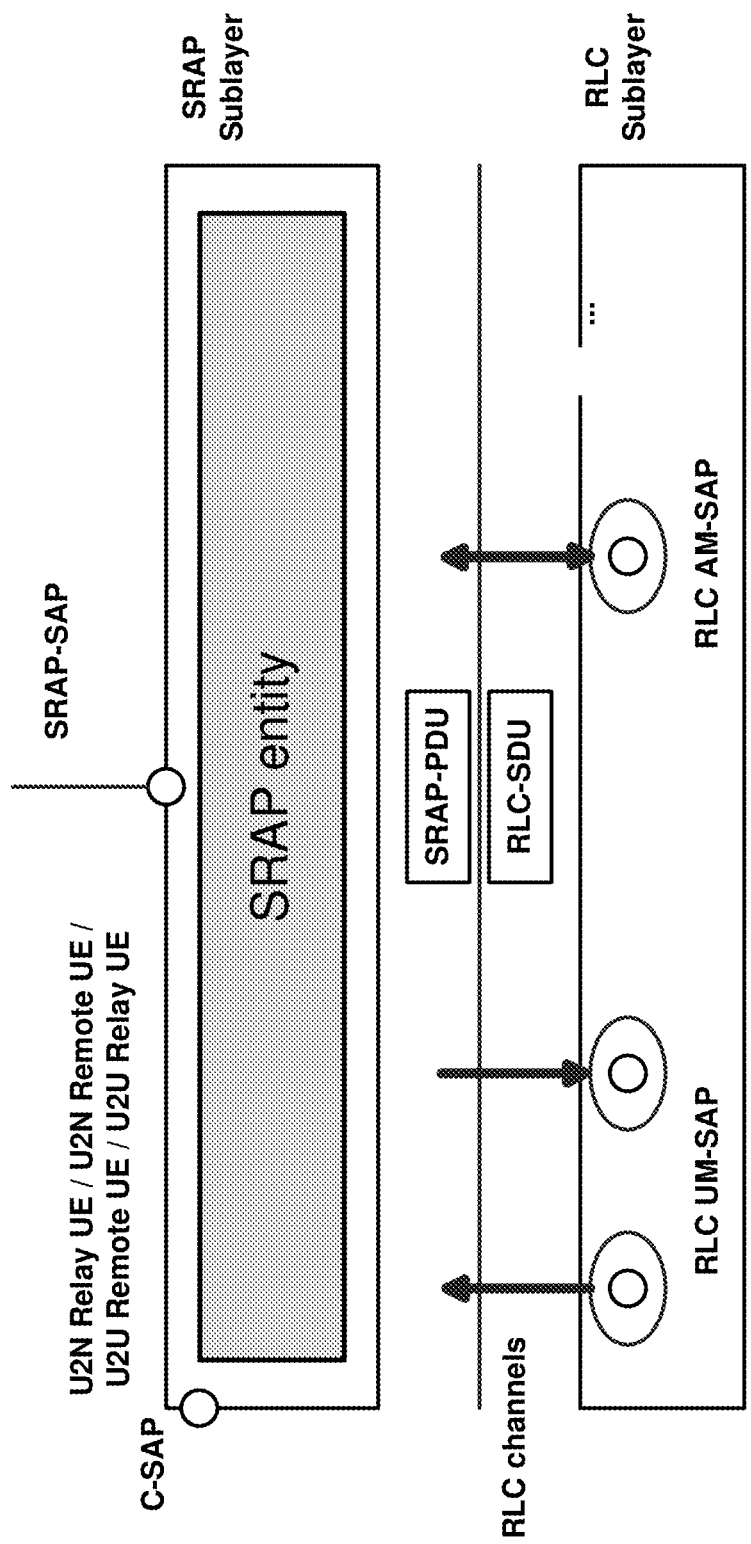
FIG. 9 is a reproduction of FIG. 4.2.2-1 of 3GPP TS 38.351 V18.2.0.

FIG. 4.2.2-1 of 3GPP TS 38.351 V18.2.0, Entitled "SRAP Structure Overview", is Reproduced As FIG. 9

On the U2N Relay UE, the SRAP sublayer contains one SRAP entity at Uu interface and a separate collocated SRAP entity at the PC5 interface. On the U2N Remote UE, the SRAP sublayer contains only one SRAP entity at the PC5 interface. On the U2U Relay UE and U2U Remote UE, the SRAP sublayer contains only one SRAP entity at the PC5 interface.

Each SRAP entity has a transmitting part and a receiving part. Across the PC5 interface in the U2N case, the transmitting part of the SRAP entity at the U2N Remote UE has a corresponding receiving part of an SRAP entity at the U2N Relay UE, and vice versa. Across the Uu interface, the transmitting part of the SRAP entity at the U2N Relay UE has a corresponding receiving part of an SRAP entity at the gNB, and vice versa.

In the example of FIG. 4.2.2-2 and FIG. 4.2.2-3, at relay UE:

For data packet not corresponding to SRB0, the receiving part on the SRAP entity of Uu interface delivers SRAP Data PDUs to the transmitting part on the collocated SRAP entity of PC5 interface, and the receiving part on the SRAP entity of PC5 interface delivers SRAP Data PDUs to the transmitting part on the collocated SRAP entity of Uu interface. As an alternative, the receiving part may deliver SRAP SDUs to the transmitting part on the collocated SRAP entity. When passing SRAP SDUs, the receiving part removes the SRAP header and the transmitting part of the relay UE adds the SRAP header with the same SRAP header content as carried on the SRAP Data PDU header prior to removal. Passing SRAP SDUs in this manner is therefore functionally equivalent to passing SRAP Data PDUs, in implementation. The following specification therefore refers to the passing of SRAP data packets.

For UL data packet corresponding to SRB0, the receiving part on the SRAP entity of PC5 interface delivers SRAP SDUs to the transmitting part on the collocated SRAP entity of Uu interface, and the transmitting part on the SRAP entity of Uu interface adds the SRAP header in accordance with clause 5.3.3.

For DL data packet corresponding to SRB0, the receiving part on the SRAP entity of Uu interface delivers SRAP Data PDUs to the transmitting part on the collocated SRAP entity of PC5 interface, and the transmitting part on the SRAP entity of PC5 interface removes the SRAP header in accordance with clause 5.2.2. As an alternative for handling DL data packet corresponding to SRB0 not shown in FIG. 4.2.2-2 or FIG. 4.2.2-3, the receiving part on the SRAP entity of Uu interface removes the SRAP header and delivers SRAP SDUs to the transmitting part on the collocated SRAP entity of PC5 interface.

5.2 DL Data Transfer

5.2.1 Receiving Operation of U2N Relay UE

Upon receiving an SRAP Data PDU from lower layer, the receiving part of the SRAP entity on the Uu interface of U2N Relay UE shall:
Deliver the SRAP data packet to the transmitting part of the collocated SRAP entity on the PC5 interface.

5.2.2 Transmitting Operation of U2N Relay UE

5.2.2.0 General

The transmitting part of the SRAP entity on the PC5 interface of U2N Relay UE receives SRAP data packets from the receiving part of the SRAP entity on the Uu interface of the same U2N Relay UE, and construct SRAP Data PDUs as needed (see clause 4.2.2).

When the transmitting part of the SRAP entity on the PC5 interface has an SRAP Data PDU to transmit, the transmitting part of the SRAP entity on the PC5 interface shall:
Determine the egress link in accordance with clause 5.2.2.1;
Determine the egress RLC channel in accordance with clause 5.2.2.2;
If the SRAP Data PDU is for SRB0 (the BEARER ID field is 0, and the bearer is identified as SRB based on sl-RemoteUE-RB-Identity associated with the entry containing the sl-EgressRLC-ChannelUu which matches the LCID of the Uu Relay RLC Channel from which the SRAP Data PDU is received):
Remove the SRAP header from the SRAP Data PDU;
Submit this SRAP Data PDU to the determined egress RLC channel of the determined egress link.

5.2.2.1 Egress Link Determination

For a SRAP Data PDU to be transmitted, SRAP entity shall:
If there is an entry in sl-RemoteUE-ToAddModList, whose sl-LocalIdentity included in sl-SRAP-ConfigRelay matches the UE ID field in SRAP Data PDU:
Determine the egress link on PC5 interface corresponding to sl-L2IdentityRemote configured for the concerned sl-LocalIdentity as specified in TS 38.331 [3].

5.2.2.2 Egress RLC Channel Determination

For a SRAP Data PDU to be transmitted, the SRAP entity shall:
If the SRAP Data PDU is for SRB0 (the BEARER ID field is 0 and the bearer is identified as SRB based on sl-RemoteUE-RB-Identity associated with the entry containing the sl-EgressRLC-ChannelUu which matches the LCID of the Uu Relay RLC Channel from which the SRAP Data PDU is received):
Determine the egress PC5 Relay RLC channel in the determined egress link corresponding to logicalChannelIdentity for SL-RLC0 as specified in TS 38.331 [3].
Else if there is an entry in sl-RemoteUE-ToAddModList, whose sl-LocalIdentity included in sl-SRAP-ConfigRelay matches the UE ID field in SRAP Data PDU, which includes an sl-RemoteUE-RB-Identity that matches the SRB identity or DRB identity of the SRAP Data PDU determined by the BEARER ID field (For the BEARER ID shared by both SRB and DRB, SRB and DRB are differentiated based on sl-RemoteUE-RB-Identity associated with the entry containing the sl-EgressRLC-ChannelUu which matches the LCID of the Uu Relay RLC Channel from which the SRAP Data PDU is received, and for DRB, the DRB identity is BEARER ID plus 1):
If the SRAP Data PDU is for SRB1 but the corresponding sl-EgressRLC-ChannelPC5 is absent in sl-SRAP-ConfigRelay:
Determine the egress PC5 Relay RLC channel in the determined egress link corresponding to logicalChannelIdentity for SL-RLC1 as specified in TS 38.331 [3].
Else:
Determine the egress PC5 Relay RLC channel in the determined egress link corresponding to sl-EgressRLC-ChannelPC5 configured for the concerned sl-LocalIdentity and concerned sl-RemoteUE-RB-Identity as specified in TS 38.331 [3].

5.2.3 Receiving Operation of U2N Remote UE

Upon receiving an SRAP Data PDU from lower layer, the receiving part of the SRAP entity shall:
If the SRAP Data PDU is not for SRB0 (not received from SL-RLC0 as specified in TS 38.331 [3]):
  If the SRAP Data PDU is received from SL-RLC1 as specified in TS 38.331 [3]:
    Remove the SRAP header of this SRAP Data PDU and deliver the SRAP SDU to PDCP entity of SRB1 by ignoring the UE ID field and BEARER ID field of this SRAP Data PDU;
  Else:
    Remove the SRAP header of this SRAP Data PDU and deliver the SRAP SDU to upper layer entity corresponding to the BEARER ID field of this SRAP Data PDU (For the BEARER ID shared by both SRB and DRB, SRB and DRB are differentiated based on sl-RemoteUE-RB-Identity associated with the entry containing the sl-EgressRLC-ChannelPC5 which matches LCID of the PC5 Relay RLC Channel from which the SRAP Data PDU is received, and for DRB, the DRB identity is BEARER ID plus 1);
Else:
  Deliver the SRAP SDU (i.e., same as SRAP PDU for SRB0) to upper layer, i.e., RRC layer entity (TS 38.331 [3]).

5.3 UL Data Transfer

5.3.1 Transmitting Operation of U2N Remote UE

The transmitting part of the SRAP entity on the PC5 interface of U2N Remote UE can receive SRAP SDU from upper layer and constructs SRAP Data PDU.
Upon receiving an SRAP SDU from upper layer, the transmitting part of the SRAP entity on the PC5 interface shall:
If the SRAP SDU is not for SRB0:
  Determine the UE ID field and BEARER ID field in accordance with clause 5.3.1.1;
  Construct an SRAP Data PDU with SRAP header, where the UE ID field and BEARER ID field are set to the determined values, in accordance with clause 6.2.2;
Else:
  Construct an SRAP Data PDU without SRAP header in accordance with clause 6.2.2.
Determine the egress RLC channel in accordance with clause 5.3.1.2;
Submit this SRAP Data PDU to the determined egress RLC channel.

5.3.1.1 UE ID Field and BEARER ID Field Determination

For an SRAP SDU received from upper layer, the SRAP entity shall:
Determine the UE ID field corresponding to sl-LocalIdentity, configured as specified in TS 38.331 [3];
Determine the BEARER ID field corresponding to SRB identity for SRB (i.e., set the BEARER ID field to srb-Identity), or corresponding to DRB identity minus 1 for DRB (i.e., set the BEARER ID field to drb-Identity minus 1), from which the SRAP SDU is received, configured as specified in TS 38.331 [3].

5.3.1.2 Egress RLC Channel Determination

For a SRAP Data PDU to be transmitted, the SRAP entity shall:
If the SRAP Data PDU is for SRB0:
  Determine the egress PC5 Relay RLC channel in the link with U2N Relay UE corresponding to logicalChannelIdentity for SL-RLC0 as specified in TS 38.331 [3].
Else if the SRAP Data PDU is for SRB1 and if there is not an entry in sl-MappingToAddModList, whose sl-RemoteUE-RB-Identity matches the SRB identity of the SRAP Data PDU, or if there is an entry in sl-MappingToAddModList without the corresponding sl-EgressRLC-ChannelPC5:
  Determine the egress PC5 Relay RLC channel in the link with U2N Relay UE corresponding to logicalChannelIdentity for SL-RLC1 as specified in TS 38.331 [3].
Else if there is an entry in sl-MappingToAddModList, whose sl-RemoteUE-RB-Identity matches the SRB identity or DRB identity of the SRAP Data PDU:
  Determine the egress PC5 Relay RLC channel of the link with U2N Relay UE corresponding to sl-EgressRLC-ChannelPC5 configured for the concerned sl-RemoteUE-RB-Identity as specified in TS 38.331 [3].

5.3.2 Receiving Operation of U2N Relay UE

Upon Receiving an SRAP Data PDU from Lower Layer, the Receiving Part of the SRAP Entity on the PC5 interface shall:
Deliver the SRAP data packet to the transmitting part of the collocated SRAP entity on the Uu interface.

5.3.3 Transmitting Operation of U2N Relay UE

The transmitting part of the SRAP entity on the Uu interface of U2N Relay UE can receive SRAP data packets from the receiving part of the SRAP entity on the PC5 interface of the same U2N Relay UE, and construct SRAP Data PDUs as needed (see clause 4.2.2).
When the transmitting part of the SRAP entity on the Uu interface has an SRAP Data PDU to transmit, the transmitting part of the SRAP entity on the Uu interface shall:
If the SRAP Data PDU is received from SL-RLC0 as specified in TS 38.331 [3]:
  Determine the UE ID field and BEARER ID field in accordance with clause 5.3.3.1;
  Construct an SRAP Data PDU with SRAP header, where the UE ID field and BEARER ID field are set to the determined values, in accordance with clause 6.2.2;
Determine the egress RLC channel in accordance with clause 5.3.3.2;
Submit this SRAP Data PDU to the determined egress RLC channel.

5.3.3.1 UE ID Field and BEARER ID Field Determination

For an SRAP Data PDU received from SL-RLC0 as specified in TS 38.331 [3], the SRAP entity shall:
If there is an entry in sl-RemoteUE-ToAddModList, whose sl-L2IdentityRemote matches the Layer-2 ID of the remote UE from which the SRAP Data PDU is received:
Determine the UE ID field corresponding to sl-LocalIdentity configured for the concerned sl-L2IdentityRemote as specified in TS 38.331 [3];
Determine the BEARER ID field as 0 (i.e., set BEARER ID field as 0).

5.3.3.2 Egress RLC Channel Determination

For a SRAP Data PDU to be transmitted, the SRAP entity shall:
If there is an entry in sl-RemoteUE-ToAddModList, whose sl-LocalIdentity included in sl-SRAP-ConfigRelay matches the UE ID field in SRAP Data PDU:
If the SRAP Data PDU is for SRB0:
Determine the egress Uu Relay RLC channel corresponding to sl-EgressRLC-ChannelUu configured for SRB0 for the concerned sl-LocalIdentity as specified in TS 38.331 [3].
Else if the SRAP Data PDU is received from SL-RLC1 as specified in TS 38.331 [3]: Determine the egress Uu Relay RLC channel corresponding to sl-EgressRLC-ChannelUu configured for SRB1 for the concerned sl-LocalIdentity as specified in TS 38.331 [3]
Else if there is an entry in sl-RemoteUE-ToAddModList which includes an sl-RemoteUE-RB-Identity matches SRB identity or DRB identity of the SRAP Data PDU determined by the BEARER ID field (For the BEARER ID shared by both SRB and DRB, SRB and DRB are differentiated based on sl-RemoteUE-RB-Identity associated with the entry containing the sl-EgressRLC-ChannelPC5 which matches LCID of the PC5 Relay RLC Channel from which the SRAP Data PDU is received, and for DRB, the DRB identity is BEARER ID plus 1):
Determine the egress Uu Relay RLC channel corresponding to sl-EgressRLC-ChannelUu configured for the concerned sl-LocalIdentity and concerned sl-RemoteUE-RB-Identity as specified in TS 38.331 [3].

6 Protocol Data Units, Formats, and Parameters
6.1 Protocol Data Units

6.1.1 Data PDU

The SRAP Data PDU is used to convey the following with or without the PDU header:
Upper layer data.

6.2 Formats

6.2.1 General

An SRAP Data PDU is a bit string that is byte aligned (i.e. multiple of 8 bits) in length. The formats of SRAP Data PDUs are described in clause 6.2.2 and their parameters are described in clause 6.3.

6.2.2 Data PDU

FIG. 6.2.2-1 shows the format of the U2N SRAP Data PDU with SRAP header being configured. This SRAP Data PDU format is applicable to U2N SRAP SDU except those for SRB0 delivered over PC5 interface.

Figure 10:
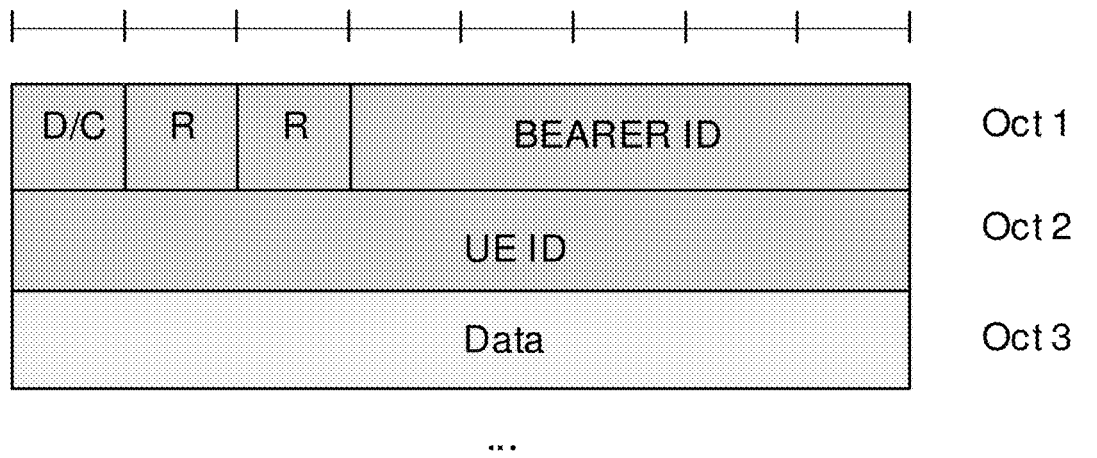
FIG. 10 is a reproduction of FIG. 6.2.2-1 of 3GPP TS 38.351 V18.2.0.

FIG. 6.2.2-1 of 3GPP TS 38.351 V18.2.0, Entitled "U2N SRAP Data PDU Format with SRAP Header", is Reproduced as FIG. 10

FIG. 6.2.2-2 shows the format of the U2N SRAP Data PDU consisting only of a data field without any SRAP header. This SRAP Data PDU format is applicable to U2N SRAP SDU for SRB0 delivered over PC5 interface.

Figure 11:
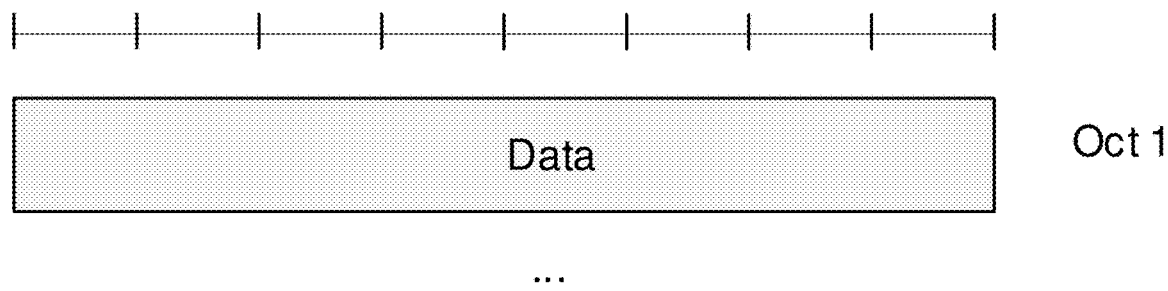
FIG. 11 is a reproduction of FIG. 6.2.2-2 of 3GPP TS 38.351 V18.2.0.

FIG. 6.2.2-2 of 3GPP TS 38.351 V18.2.0, Entitled "U2N SRAP Data PDU Format without SRAP Header", is Reproduced as FIG. 11

6.3 Parameters

6.3.1 General

If not otherwise mentioned in the definition of each field the bits in the parameters shall be interpreted as follows: the left most bit is the first and most significant and the right most bit is the last and least significant bit.
Unless otherwise mentioned, integers are encoded in standard binary encoding for unsigned integers. In all cases the bits appear ordered from MSB to LSB when read in the PDU.

6.3.2 UE ID

Length: 8 bits.
In U2N Relay case, this field carries local identity of U2N Remote UE. In U2U Relay case, there are two UE ID fields: the first one carrying the local identity of SRC U2U Remote UE, the second one carrying the local identity of DST U2U Remote UE.

6.3.3 Bearer Id

Length: 5 bits.
In U2N Relay case, this field carries information to identify Uu radio bearer for U2N Remote UE. For SRBs, the value is set to SRB Identity (which is configured by RRC parameter srb-Identity). For DRBs, the value is set to DRB Identity (which is configured by RRC parameter drb-Identity) minus 1.
In U2U Relay case, this field carries information to identify end-to-end PC5 radio bearer for U2U Remote UE. For SL-SRBs, the value is set to 0/1/2/3 for SL-SRB 0/1/2/3 respectively. For SL-DRBs, the value is set to the 5 LSBs of slrb-PC5-ConfigIndex used in end-to-end SL DRB configuration procedure as specified in TS 38.331 [3].

6.3.4 Data

Length: Variable
This field carries the SRAP SDU (i.e. PDCP PDU or RRC PDU).

6.3.5 R

Length: 1 bit
Reserved. In this release, reserved bits shall be set to 0. Reserved bits shall be ignored by the receiver.

6.3.6 D/C

Length: 1 bit
This field indicates whether the corresponding SRAP PDU is an SRAP Data PDU or an SRAP Control PDU (not used in this release).

Figures 12, 13:
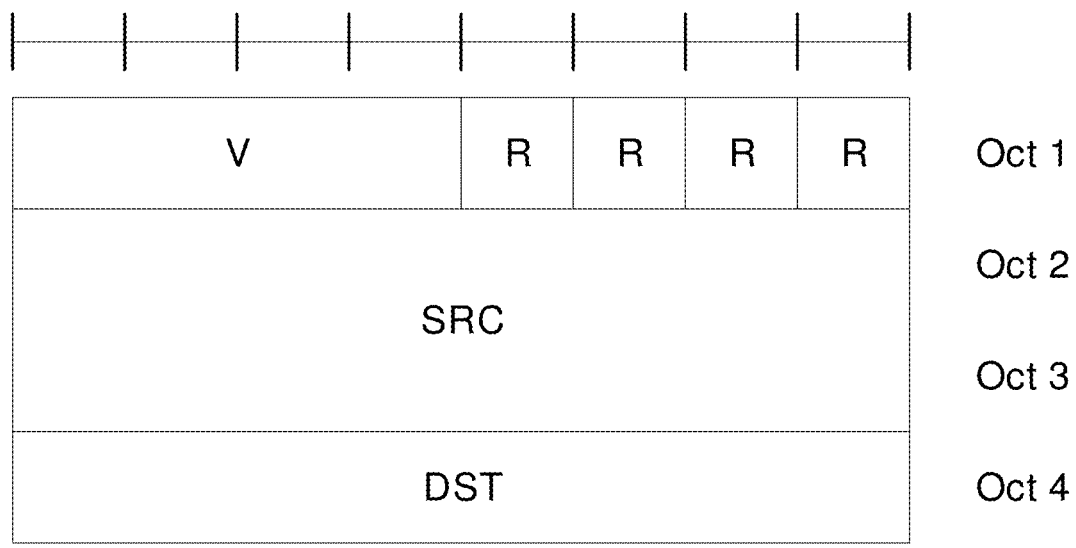
FIG. 12 is a reproduction of Table 6.3.6-1 of 3GPP TS 38.351 V18.2.0.
FIG. 13 is a reproduction of FIG. 6.1.6-1 of 3GPP TS 38.321 V18.2.0.

Table 6.3.6-1 of 3GPP TS 38.351 V18.2.0, Entitled "D/C Field", is Reproduced as FIG. 12

3GPP TS 38.321 specifies MAC PDU for SL-SCH as follows:

6.1.6 MAC PDU (SL-SCH)

A MAC PDU consists of one SL-SCH subheader and one or more MAC subPDUs. Each MAC subPDU consists of one of the following:
A MAC subheader only (including padding);
A MAC subheader and a MAC SDU;
A MAC subheader and a MAC CE;
A MAC subheader and padding.
The MAC SDUs are of variable sizes.
Each MAC subheader except SL-SCH subheader corresponds to either a MAC SDU, a MAC CE, or padding.
The SL-SCH subheader is of a fixed size and consists of the seven header fields
V/R/R/R/R/SRC/DST.

FIG. 6.1.6-1 of 3GPP TS 38.321 V18.2.0, Entitled "SL-SCH MAC Subheader", is Reproduced as FIG. 13

A MAC subheader except for fixed-sized MAC CE and padding consists of the four header fields R/F/LCID/L as depicted in FIG. 6.1.2-1 (with 8-bit L field) and FIG. 6.1.2-2 (with 16-bit L field). A MAC subheader for fixed-sized MAC CE and padding consists of the two header fields R/LCID as depicted in FIG. 6.1.2-3.
SL MAC subPDU(s) with MAC SDU(s) is placed after the SL-SCH subheader and before the MAC subPDU with a MAC CE and the MAC subPDU with padding in the MAC PDU as depicted in FIG. 6.1.6-2. SL MAC subPDU with a MAC CE is placed after all the MAC subPDU(s) with MAC SDU and before the MAC subPDU with padding in the MAC PDU as depicted in FIG. 6.1.6-2. The size of padding can be zero.

Figure 14:
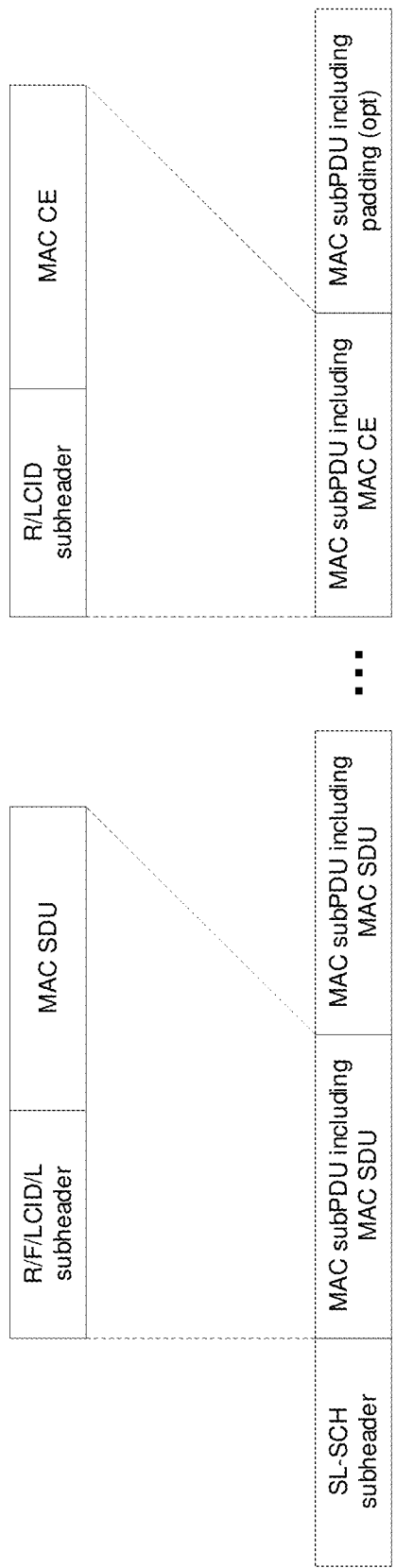
FIG. 14 is a reproduction of FIG. 6.1.6-2 of 3GPP TS 38.321 V18.2.0.

FIG. 6.1.6-2 of 3GPP TS 38.321 V18.2.0, Entitled "Example of an SL MAC PDU", is Reproduced as FIG. 14

A maximum of one MAC PDU can be transmitted per TB per MAC entity.

6.2.4 MAC Subheader for SL-SCH

The MAC subheader consists of the following fields:
V: The MAC PDU format version number field indicates which version of the SL-SCH subheader is used. In this version of the specification, the V field is set to 0. The size of the V field is 4 bits;
SRC: The SRC field carries the 16 most significant bits of the Source Layer-2 ID set to the identifier provided by upper layers as defined in TS 23.287 or TS 23.304 [26]. The length of the field is 16 bits;
DST: The DST field carries the 8 most significant bits of the Destination Layer-2 ID set to the identifier provided by upper layers as defined in TS 23.287 or TS 23.304 [26]. The length of the field is 8 bits;
LCID: The Logical Channel ID field identifies the logical channel instance of the corresponding MAC SDU or the type of the corresponding MAC CE within the scope of one Source Layer-2 ID and Destination Layer-2 ID pair or padding as described in Tables 6.2.4-1 for SL-SCH. There is one LCID field per MAC subheader except for SL-SCH subheader. The values of LCID from 21 to 36 identify the logical channels used to send duplicated RLC SDUs from logical channels of which the values of LCID from 4 to 19 respectively in sequential order. The size of the LCID field is 6 bits;
L: The Length field indicates the length of the corresponding MAC SDU or variable-sized MAC CE in bytes. There is one L field per MAC subheader except for SL-SCH subheader and subheaders corresponding to the fixed-sized MAC CE or padding. The size of the L field is indicated by the F field;
F: The Format field indicates the size of the Length field. There is one F field per MAC subheader except for SL-SCH subheader and subheaders corresponding to the fixed-sized MAC CE or padding. The size of the F field is 1 bit. The value 0 indicates 8 bits of the Length field. The value 1 indicates 16 bits of the Length field;
R: Reserved bit, set to 0.
The MAC subheader is octet aligned.

Table 6.2.4-1 of 3GPP TS 38.321 V18.2.0, Entitled "Values of LCID for SL-SCH", is Reproduced As FIG. 15

Single-hop UE-to-Network (U2N) Relay was specified in Release 18. For single-hop U2N Relay, a U2N Relay UE may be used to support data communication between a remote UE and the network in case the remote UE cannot communicate with the network directly. A U2N Relay UE needs to establish one PC5 unicast link (or a PC5 RRC connection) with the remote UE and establish a RRC connection with a network node (e.g. a gNB) to support data communication between the remote UE and the network via the U2N Relay UE.

According to 3GPP TR 23.700-03, multi-hop U2N Relay will be supported in Release 19 and the network operators shall be able to define the maximum number of hops supported in their networks when using relay UEs. FIG. 6.1.1-1 (not shown) of 3GPP TR 23.700-03 illustrates an example architecture of multi-hop UE-to-Network Relay, where a 5G ProSe Remote UE connects with the NG-RAN via an Intermediate U2N Relay UE and a 5G ProSe U2N Relay UE (or a L2 U2N Relay UE). As shown in this figure, it is clear only the 5G ProSe U2N Relay UE needs to be in coverage of NG-RAN and be able to establish a RRC connection with the NG-RAN in order to support multi-hop UE-to-Network Relay. Other Intermediate U2N Relay UE(s) can be either in coverage or out of coverage.

FIG. 16.12.2.1-2 (reproduced as FIG. 6) of 3GPP TS 38.300 illustrates the control plane protocol stack for single-hop L2 U2N Relay. It is supposed a PC5 interface will be used between an Intermediate U2N Relay UE and a L2 U2N Relay UE to support multi-hop L2 U2N Relay as shown in FIG. 16.

FIG. 16.12.5.1-1 (reproduced as FIG. 5) of 3GPP TS 38.300 specifies the L2 U2N Remote UE connection establishment procedure for single-hop L2 U2N Relay. During this procedure, the Remote UE sends a RRCSetupRequest message, on SRB0, to the gNB via the L2 U2N Relay UE and receives a RRCSetup message, on SRB0, from the gNB via the L2 U2N Relay UE. As described in section 16.12.2.1 of 3GPP TS 38.300, for L2 U2N Remote UE's message on SRB0, the SRAP header is not present over PC5 hop, but the SRAP header is present over Uu hop for both UL and DL. In case of multi-hop L2 U2N Relay, it can be expected that the Intermediate U2N Relay UE should also forward the RRCSetupRequest message received from the Remote UE to the gNB via the L2 U2N Relay UE. Since the SRAP header is present over Uu hop for L2 U2N Remote UE's message on SRB0, the Uu-SRAP PDU sent by the L2 U2N Relay UE to the gNB should include the local ID of the Remote UE (or the local Remote UE ID), while the PC5-SRAP PDU sent from the Remote UE to the Intermediate U2N Relay UE includes no header. How to enable the L2 U2N Relay UE includes the local ID of the Remote UE in the Uu-SRAP PDU sent to the gNB should be considered.

There may be two potential directions to consider: (1) the SRAP header is not present over the PC5 hop between the Intermediate U2N Relay UE and the L2 U2N Relay UE and (2) the SRAP header is present over the PC5 hop between the Intermediate U2N Relay UE and the L2 U2N Relay UE.

Direction (1): for L2 U2N Remote UE's message on SRB0, the SRAP header is not present over the PC5 hop between the Intermediate U2N Relay UE and the L2 U2N Relay UE.

Similar to the L2 U2N Remote UE connection establishment procedure for single-hop L2 U2N Relay specified in 3GPP TS 38.300, before the RRCSetupRequest message is sent by the Remote UE, a Relay discovery procedure and a PC5 connection establishment procedure should have been performed among the Remote UE, the Intermediate U2N Relay UE, and the L2 U2N Relay UE so that the Remote UE can find the Intermediate U2N Relay UE and the L2 U2N Relay UE for connecting to the gNB. Therefore, the Remote UE may be known to the L2 U2N Relay UE during the Relay discovery procedure or the PC5 connection establishment procedure. For example, information identifying the Remote UE (e.g. User Info ID or L2 ID of the Remote UE) may be included in a Relay discovery message or a Direct Communication Request message received by the L2 U2N Relay UE.

In this situation, it is feasible to limit that only one L2 U2N Remote UE connection establishment procedure can be performed at one time so that the L2 U2N Relay UE could assume the RRCSetupRequest message included in a PC5 SRAP PDU (without header), received from the Intermediate U2N Relay UE, comes from the Remote UE known from the previous Relay discovery procedure or PC5 connection establishment procedure. In this situation, the L2 U2N Relay UE could include the (local) UE ID of the Remote UE in the header of the Uu SRAP PDU (which carries the RRCSetupRequest message) sent to the gNB. In one embodiment, the (local) UE ID of the Remote UE is provided by the gNB (e.g. in response to reception of a Sidelink UE Information message from the L2 U2N Relay UE). The (local) UE ID of the Remote UE may be included in a RRC Reconfiguration message sent from the gNB, together with a L2 ID or a User Info ID of the Remote UE.

Similarly, when receiving the RRCSetup message (on SRB0) from the L2 U2N Relay UE in a PC5 SRAP PDU without header, the Intermediate U2N Relay UE could assume the RRCSetup message is for the Remote UE known from the previous Relay discovery procedure or PC5 connection establishment procedure so that the Intermediate U2N Relay UE could forward the RRCSetup message to the Remote UE in a PC5 SRAP PDU without header, wherein a header of the MAC PDU carrying the PC5 SRAP PDU includes a field identifying the Remote UE.

Direction (2): for L2 U2N Remote UE's message on SRB0, the SRAP header is present over the PC5 hop between the Intermediate U2N Relay UE and the L2 U2N Relay UE.

It is possible for the Intermediate U2N Relay UE to obtain the (local) UE ID of the Remote UE from the gNB. For example, the (local) UE ID of the Remote UE may be provided by the gNB (e.g. in response to reception of a Sidelink UE Information message from the Intermediate U2N Relay UE). In one embodiment, the Intermediate U2N Relay UE may send the Sidelink UE Information message to the gNB (via the L2 U2N Relay UE) after receiving the RRCSetupRequest message on SRB0 from the Remote UE, wherein the RRCSetupRequest message is included in a PC5 SRAP PDU without header.

The (local) UE ID of the Remote UE may be included in a RRC Reconfiguration message sent from the gNB (via the L2 U2N Relay UE), together with a L2 ID or a User Info ID of the Remote UE, wherein the L2 ID or the User Info ID of the Remote UE may be known by the Intermediate U2N Relay UE during the previous Relay discovery procedure or PC5 connection establishment procedure. When receiving the RRCSetupRequest message on SRB0, the Intermediate U2N Relay UE could identify the Remote UE according to the destination field in the header of an MAC PDU which carries the PC5 SRAP PDU without header. In this situation, the Intermediate U2N Relay UE may then include the (local) UE ID of the Remote UE in the header of the PC5 SRAP PDU used to send the RRCSetupRequest message to the L2 U2N Relay UE. A BEARER ID field of '0' may also be included in the header.

Similarly, when receiving the RRCSetup message (on SRB0) from the gNB in a Uu SRAP PDU with a header, the L2 U2N Relay UE may also send the RRCSetup message to the Intermediate U2N Relay UE in a PC5 SRAP PDU with a header, which includes the (local) UE ID of the Remote UE and a BEARER ID field of '0'. Then, the Intermediate U2N Relay UE may forward the RRCSetup message to the Remote UE in a PC5 SRAP PDU without header, wherein a header of the MAC PDU carrying the PC5 SRAP PDU includes a field identifying the Remote UE.

After receiving the RRCSetup message, the Remote UE may transmit a RRCSetupComplete message on SRB1 to the gNB via the Intermediate U2N Relay UE and the L2 U2N Relay UE, wherein each SRAP PDU carrying the RRCSetupComplete message over all 3 hops has a header.

Figure 17:
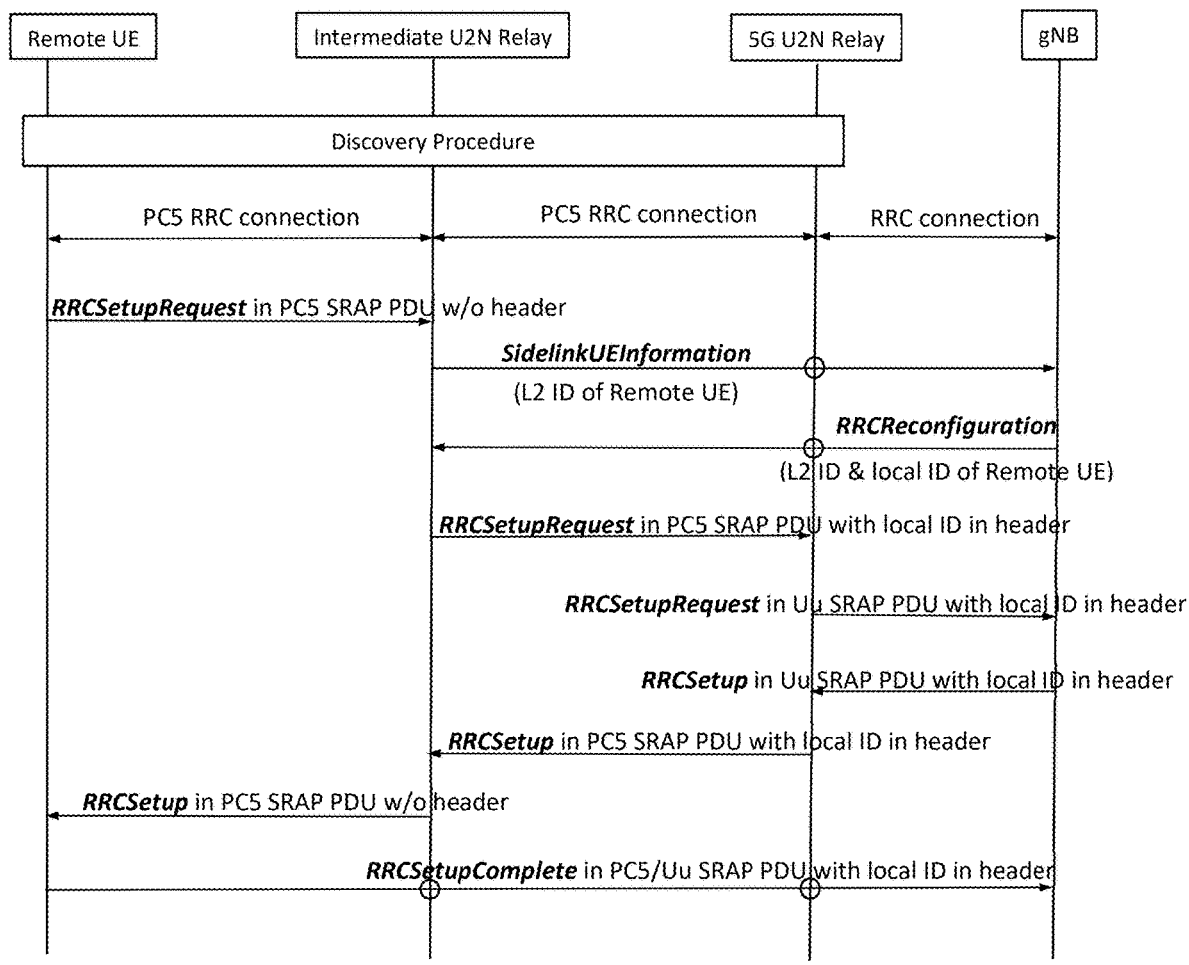
FIG. 17 is a message flow chart illustrating an example of L2 U2N Remote UE connection establishment for two-hop L2 UE-to-Network Relay according to one exemplary embodiment.

FIG. 17 illustrates an example of L2 U2N Remote UE connection establishment for two-hop L2 UE-to-Network Relay based on Direction (2) according to one exemplary embodiment.

Figure 18:
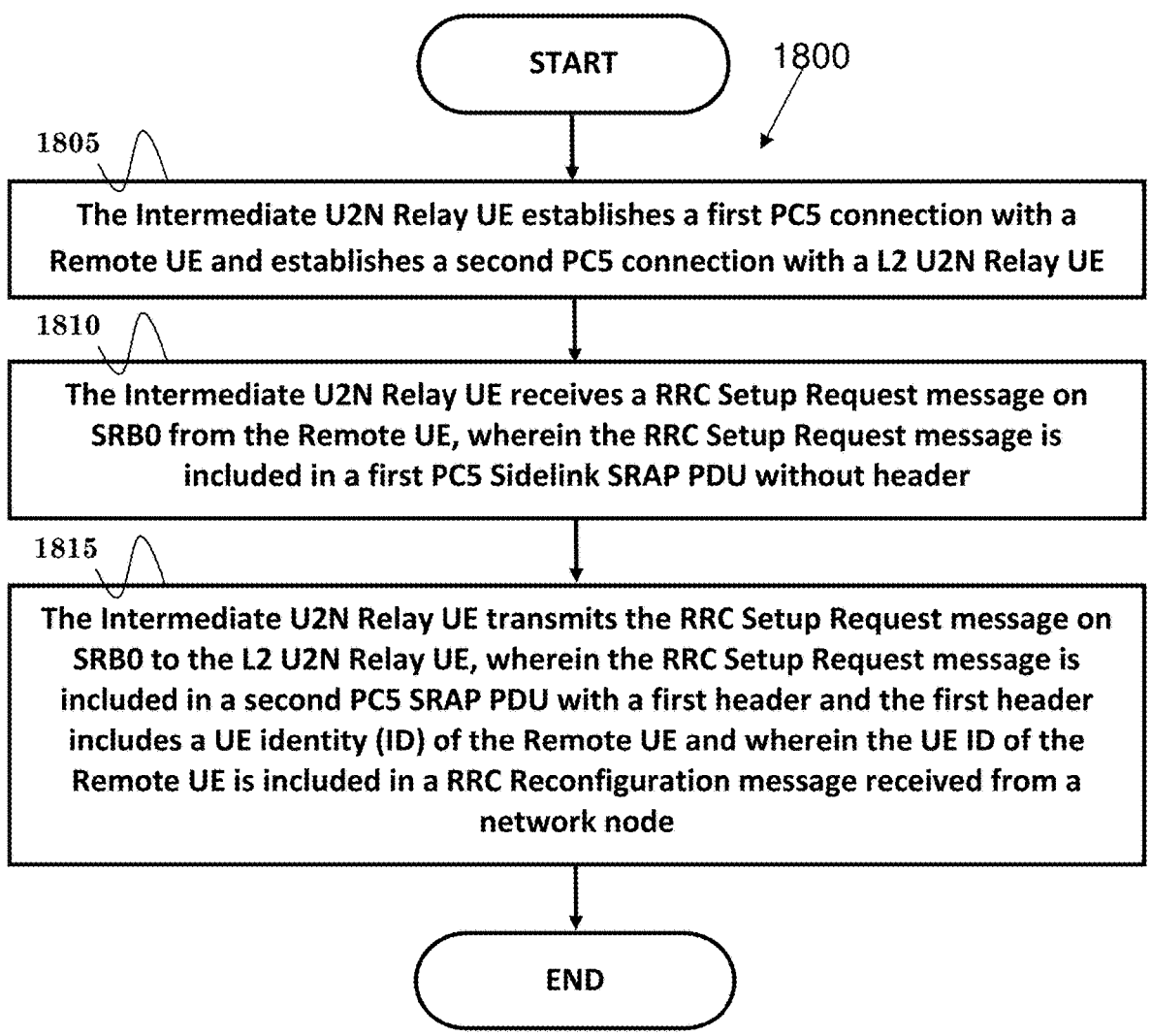
FIG. 18 is a flow chart according to one exemplary embodiment.

FIG. 18 is a flow chart 1300 for an Intermediate U2N Relay UE. In step 1805, the Intermediate U2N Relay UE establishes a first PC5 connection with a Remote UE and establishes a second PC5 connection with a Layer-2 (L2) U2N Relay UE. In step 1810, the Intermediate U2N Relay UE receives a Radio Resource Control (RRC) Setup Request message on SRB0 from the Remote UE, wherein the RRC Setup Request message is included in a first PC5 Sidelink Relay Adaptation Protocol (SRAP) Protocol Data Unit (PDU) without header. In step 1815, the Intermediate U2N Relay UE transmits the RRC Setup Request message on SRB0 to the L2 U2N Relay UE, wherein the RRC Setup Request message is included in a second PC5 SRAP PDU with a first header and the first header includes a UE identity (ID) of the Remote UE and wherein the UE ID of the Remote UE is included in a RRC Reconfiguration message received from a network node.

In one embodiment, the first PC5 SRAP PDU may be included in a Medium Access Control (MAC) PDU and a header of the MAC PDU may include a field identifying the Remote UE.

In one embodiment, the Intermediate U2N Relay UE could receive a RRC Setup message on SRB0 from the L2 U2N Relay UE, wherein the RRC Setup message is included in a third PC5 SRAP PDU with a second header and the second header may include the UE ID of the Remote UE. The method of claim 3, wherein the first header or the second header may further include a BEARER ID of "0".

In one embodiment, the Intermediate U2N Relay UE could transmit the RRC Setup message on SRB0 to the Remote UE, wherein the RRC Setup message is included in a fourth PC5 SRAP PDU without header. The Intermediate U2N Relay UE could receive a RRC Setup Complete message on SRB1 from the Remote UE, wherein the RRC Setup Complete message is included in a fifth PC5 SRAP PDU with a third header and the third header includes the UE ID of the Remote UE. The Intermediate U2N Relay UE could transmit the RRC Setup Complete message on SRB1 to the L2 U2N Relay UE, wherein the RRC Setup Complete message is included in a sixth PC5 SRAP PDU with a fourth header and the fourth header includes the UE ID of the Remote UE. The third header or the fourth header may further include a BEARER ID of "1".

In one embodiment, the Intermediate U2N Relay UE could transmit a Sidelink UE Information message to the network node after the RRC Setup Request message is received from the Remote UE. The RRC Reconfiguration message may be received from the network node after the Sidelink UE Information message is transmitted to the network node.

Referring back to FIGS. 3 and 4, in one exemplary embodiment from the perspective of a UE. The UE 300 includes a program code 312 stored in the memory 310. The CPU 308 could execute program code 312 to enable the Intermediac U2N Relay UE (i) to . . . , (ii) to . . . , and (ii) to . . . . Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for an Intermediate UE-to-Network (U2N) Relay User Equipment (UE), comprising:
the Intermediate U2N Relay UE establishes a first PC5 connection with a Remote UE and establishes a second PC5 connection with a Layer-2 (L2) U2N Relay UE;
the Intermediate U2N Relay UE receives a Radio Resource Control (RRC) Setup Request message on SRB0 from the Remote UE, wherein the RRC Setup Request message is included in a first PC5 Sidelink Relay Adaptation Protocol (SRAP) Protocol Data Unit (PDU) without header; and
the Intermediate U2N Relay UE transmits the RRC Setup Request message on SRB0 to the L2 U2N Relay UE, wherein the RRC Setup Request message is included in a second PC5 SRAP PDU with a first header and the first header includes a UE identity (ID) of the Remote UE and wherein the UE ID of the Remote UE is included in a RRC Reconfiguration message received by the Intermediate U2N Relay UE from a network node.

2. The method of claim 1, wherein the first PC5 SRAP PDU is included in a Medium Access Control (MAC) PDU and a header of the MAC PDU includes a field identifying the Remote UE.

3. The method of claim 1, further comprising:
the Intermediate U2N Relay UE receives a RRC Setup message on SRB0 from the L2 U2N Relay UE, wherein the RRC Setup message is included in a third PC5 SRAP PDU with a second header and the second header includes the UE ID of the Remote UE.

4. The method of claim 3, wherein the first header or the second header further includes a BEARER ID of "0".

5. The method of claim 3, further comprising:
the Intermediate U2N Relay UE transmits the RRC Setup message on SRB0 to the Remote UE, wherein the RRC Setup message is included in a fourth PC5 SRAP PDU without header.

6. The method of claim 5, further comprising:
the Intermediate U2N Relay UE receives a RRC Setup Complete message on SRB1 from the Remote UE, wherein the RRC Setup Complete message is included in a fifth PC5 SRAP PDU with a third header and the third header includes the UE ID of the Remote UE.

7. The method of claim 6, further comprising:
the Intermediate U2N Relay UE transmits the RRC Setup Complete message on SRB1 to the L2 U2N Relay UE, wherein the RRC Setup Complete message is included in a sixth PC5 SRAP PDU with a fourth header and the fourth header includes the UE ID of the Remote UE.

8. The method of claim 7, wherein the third header or the fourth header further includes a BEARER ID of "1".

9. The method of claim 1, further comprising:
the Intermediate U2N Relay UE transmits a Sidelink UE Information message to the network node after the RRC Setup Request message is received from the Remote UE.

10. The method of claim 9, wherein the RRC Reconfiguration message is received from the network node after the Sidelink UE Information message is transmitted to the network node.

11. An Intermediate UE-to-Network (U2N) Relay User Equipment (UE), comprising:
a control circuit;
a processor installed in the control circuit;
a memory installed in the control circuit and coupled to the processor;
wherein the processor is configured to execute a program code stored in the memory to:
establish a first PC5 connection with a Remote UE and establishes a second PC5 connection with a Layer-2 (L2) U2N Relay UE;
receive a Radio Resource Control (RRC) Setup Request message on SRB0 from the Remote UE, wherein the RRC Setup Request message is included in a first PC5 Sidelink Relay Adaptation Protocol (SRAP) Protocol Data Unit (PDU) without header; and
transmit the RRC Setup Request message on SRB0 to the L2 U2N Relay UE, wherein the RRC Setup Request message is included in a second PC5 SRAP PDU with a first header and the first header includes a UE identity (ID) of the Remote UE and wherein the UE ID of the Remote UE is included in a RRC Reconfiguration message received by the Intermediate U2N Relay UE from a network node.

12. The Intermediate U2N Relay UE of claim 11, wherein the first PC5 SRAP PDU is included in a Medium Access Control (MAC) PDU and a header of the MAC PDU includes a field identifying the Remote UE.

13. The Intermediate U2N Relay UE of claim 11, wherein the processor is further configured to execute a program code stored in the memory to:
receive a RRC Setup message on SRB0 from the L2 U2N Relay UE, wherein the RRC Setup message is included in a third PC5 SRAP PDU with a second header and the second header includes the UE ID of the Remote UE.

14. The Intermediate U2N Relay UE of claim 13, wherein the first header or the second header further includes a BEARER ID of "0".

15. The Intermediate U2N Relay UE of claim 13, wherein the processor is further configured to execute a program code stored in the memory to:
  transmit the RRC Setup message on SRB0 to the Remote UE, wherein the RRC Setup message is included in a fourth PC5 SRAP PDU without header.

16. The Intermediate U2N Relay UE of claim 15, wherein the processor is further configured to execute a program code stored in the memory to:
  receive a RRC Setup Complete message on SRB1 from the Remote UE, wherein the RRC Setup Complete message is included in a fifth PC5 SRAP PDU with a third header and the third header includes the UE ID of the Remote UE.

17. The Intermediate U2N Relay UE of claim 16, wherein the processor is further configured to execute a program code stored in the memory to:
  transmit the RRC Setup Complete message on SRB1 to the L2 U2N Relay UE, wherein the RRC Setup Complete message is included in a sixth PC5 SRAP PDU with a fourth header and the fourth header includes the UE ID of the Remote UE.

18. The Intermediate U2N Relay UE of claim 17, wherein the third header or the fourth header further includes a BEARER ID of "1".

19. The Intermediate U2N Relay UE of claim 11, wherein the processor is further configured to execute a program code stored in the memory to:
  transmit a Sidelink UE Information message to the network node after the RRC Setup Request message is received from the Remote UE.

20. The Intermediate U2N Relay UE of claim 19, wherein the RRC Reconfiguration message is received from the network node after the Sidelink UE Information message is transmitted to the network node.

* * * * *